Figures 1, 2:
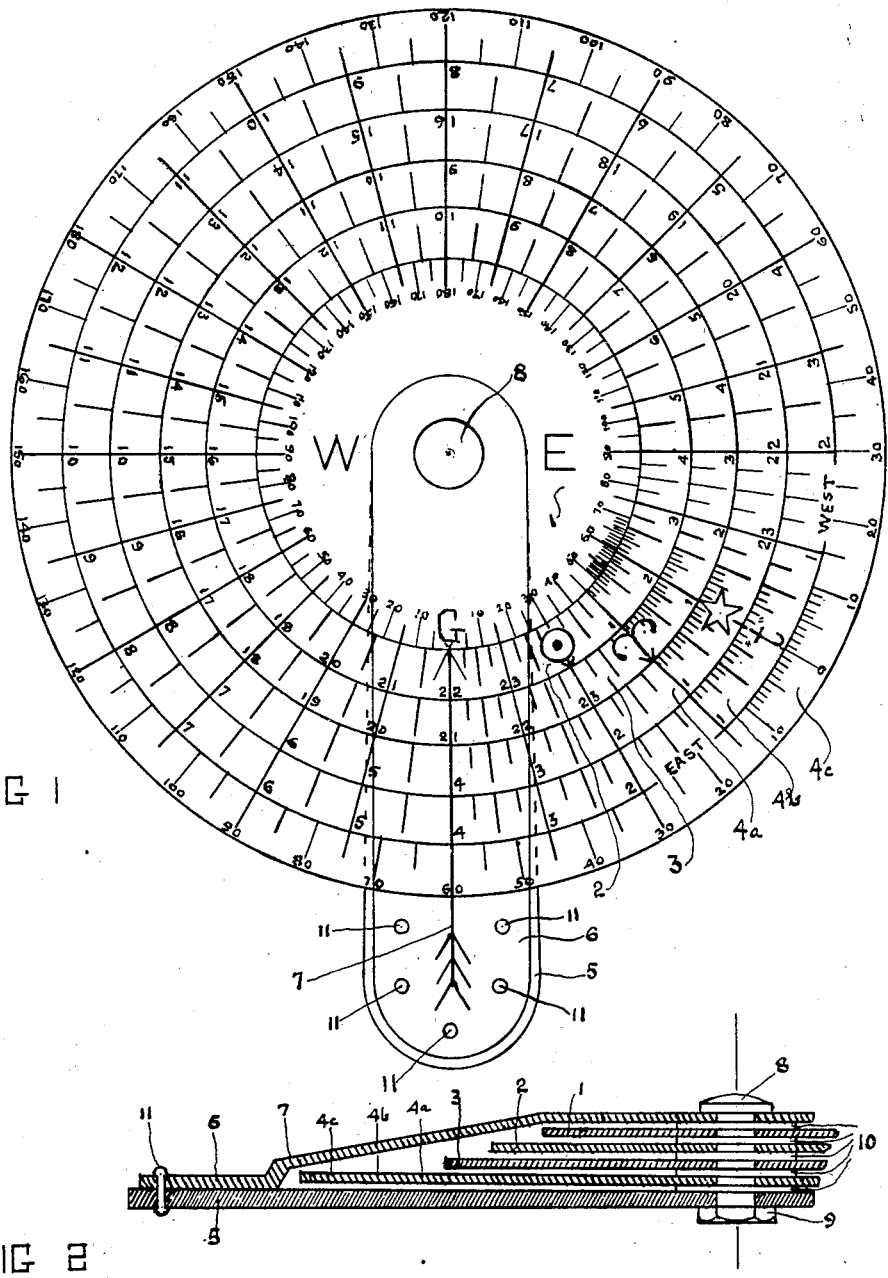

July 23, 1946.  E. HILL  2,404,709

CALCULATING INSTRUMENT

Filed July 10, 1945

INVENTOR.
Ebenezer Hill
BY
Charles J Holland

Patented July 23, 1946

2,404,709

UNITED STATES PATENT OFFICE 2,404,709

CALCULATING INSTRUMENT

Ebenezer Hill, Stamford, Conn.

Application July 10, 1945, Serial No. 604,234

7 Claims. (Cl. 235—78)

The present invention relates to calculating instruments and more particularly to a calculating instrument adapted to solve problems of importance in navigation. Among the problems that can be solved by this instrument is the hour angle of a star, the line of bearing, the star that will be on a given meridian at a given date and hour, the time by chronometer at which a given star will be on given meridian on a given date, and various other problems. In fact, if any one of the factors—date, bearing, time by chronometer, longitude, name of star or hour angle of a star—is unknown and the other four factors are known, the unknown factor can be calculated on the instrument of the present invention. These problems are generally worked out with paper and pencil by rather complicated and time consuming methods.

In my Patent No. 1,145,020, issued July 6, 1915, I have described and claimed an instrument by which the hour angle of any given star can be ascertained mechanically. The hour angle of a star is one of the factors employed in determining the exact position of a body or locality on the earth's surface, such, for instance, as the position of an aeroplane or of a ship at sea. The hour angle is the angle expressed in time between the meridian of longitude of a given place and the meridian through a given celestial body which is used as a basis of reference. It is, in other words, the distance in hours, minutes and seconds of a selected star or planet away from the meridian at a given time. In navigation, this quantity is referred to as $t$.

The instrument described and claimed in my said patent, while it provided a means of ascertaining the hour angle quite quickly, a thing that had not previously been thought possible by mechanical means, nevertheless had limitations that it is the object of the present invention to overcome. For instance, when the hour angle had actually been determined, it was necessary with that instrument to convert the result into degrees, minutes and seconds of bearing from the meridian, in order to lay out the line of bearing from the dead reckoning position assumed. The line of position is laid out perpendicularly to this line of bearing. It was, therefore, necessary to refer to the conversion tables of the Nautical Almanac and work out the change from terms of time to terms of arc. This not only took time but had the further disadvantage that error was likely to occur. Among other advantages is the fact that on the instrument of the present invention, the hour angle and the conversion into degrees of arc, and whether easterly or westerly from the meridian, are determined simultaneously without reference to the Nautical Almanac. Furthermore, the operation of the instrument of the present invention is more rapid and more accurate and solves several additional problems not solvable on the instrument of previous patent above referred to.

The present inventin consists of a number of disks concentrically arranged and pivotally mounted at a common center so as to be rotated one above the other. The disks are of different diameters, the smallest one being at the top, and each disk below the top disk is of sufficiently greater diameter to expose a margin on which are calibrated divisions adjacent to a circle described by the perimeter of the disk next above. All the disks are rotatably mounted on a handle which carries a transparent rider extending across all the disks and on which an arrow extends radially across all the disks to the edge of the top disk where it terminates in a point. The handle and the rider secured together form a fork between the prongs of which all the disks are free to rotate. The structure and arrangement of the calibrations differ markedly from that of the instrument of said patent, and by reason thereof greater speed and accuracy are obtainable.

The invention will be more clearly understood from the drawing in which Fig. 1 represents a plan view of the device of the invention, and Fig. 2 is a sectional elevation of the same with the handle and portions of the disks broken away.

Referring now to the drawing, a handle 5 extends beneath the device to the pivot 8 and, secured immovably thereto by the rivets 11, is a rider 6 of transparent material which extends over the device to the pivot 8. Between the handle and the rider the disks 1, 2, 3 and 4 can be freely rotated since the pivot 8 rotatably fastens the disks at a common center between the handle and the rider. The pivot 8 is secured by nut 9.

The top or longitude disk 1 is provided with graduations around its perimeter representing 180° west longitude running clockwise from zero and 180° east longitude running counterclockwise from zero. Zero on this disk is indicated by the letter G indicating Greenwich. A sun disk or Greenwich mean time disk 2 is immediately below the longitude disk 1 and is of larger diameter than disk 1. It is provided with graduations indicating hours and minutes running counterclockwise from zero to 24. Zero on this disk is indicated by the astronomical sign for the sun. The graduations are not placed on the perimeter of this disk, as in the case of disk 1, but are placed on a circle corresponding to the circumference of disk 1. Immediately below the sun disk 2, and of larger diameter, is the Aries disk 3. On this disk are graduations representing hours and minutes running counterclockwise from zero to 24 on a circle corresponding to the circumference of the sun disk 2. Zero on this disk is indicated by the zodiacal symbol for Aries. Below the Aries disk 3 is a fourth disk 4, still larger in diameter than the Aries disk. On this disk are three scales 4ª, 4ᵇ, and 4ᶜ concentrically arranged. The scale 4ª is provided with graduations representing hours and minutes of right ascension of a star running clockwise on a circle corresponding to the circumference of the Aries disk 3. The graduations run from zero, indicated by a star, to 24. Scale 4ᵇ, also on the same disk 4, is the hour angle scale outside the star right ascension scale. It is provided with graduations running from zero to 12 clockwise and from zero to 12 counterclockwise. Zero on the hour angle scale is indicated by $t$ in line with the zero indicated by a star on the star right ascension scale. Scale 4ᶜ is graduated in degrees and minutes of arc, east and west. Its zero is in alignment with the zero of scales 4ª and 4ᵇ. The graduations on the scales are partially indicated in Fig. 1. The rider 6 carries an arrow 7 whose point bears on the perimeter of the longitude disk 1 and whose shaft thus crosses radially above disks 2, 3 and 4. Washers 10 (Fig. 2) between the disks serve to separate them so as to provide facility of rotation.

Placing the hour and minute calibrations adjacent the perimeter of the disk next above, except, of course, in the case of the calibrations on the longitude disk, insures greater accuracy and speed in obtaining the solution of the problem. The zero point of the disk immediately above can be placed exactly on the graduation mark without the necessity of following across the exposed area from the zero point of the disk above to graduations on the outside perimeter of the exposed area. The zero indications G, sun and Aries, are, however, at the perimeters of their respective disks and on the hour angle scale directions are indicated by the words East and West on either side of zero.

Assuming that the problem to be solved is to obtain $t$ when the dead reckoning position is known and the date and time by chronometer or local time and the name of the star are known. Then the right ascension of the mean sun and the right ascension of the star for the hour and minute are obtained from the Nautical Almanac tables. Ordinarily, having this information, the navigator would do his computation on paper according to one or other of several methods, any of which would take considerable time.

If we assume that the problem (as given in the Nautical Almanac) is to find the angle hour of Vega (a Lyrae) October 14, 1945, at 9 h 10 m p. m. local time in longitude plus 4 h 22 m 8.0 s=65°32′ west, we then may compute the hour angle with pencil and paper in the following manner given in the Nautical Almanac for 1945, page 315:

| | | | | |
|---|---|---|---|---|
| Local time | Oct. 14 | 9 h | 10 m | 0.0 s P. M. |
| | =Oct. 14 | 21 h | 10 m | |
| Longitude | | +4 h | 22 m | 8 s |
| Greenwich mean time | Oct. 15 | 1 h | 32 m | 8.0 s |
| R. A. of Vega | | 18 h | 35 m | 5.0 s |

The value 1 h 32 m 8.0 s is obtained by taking the local time 9 h 10 m and adding the 4 h 22 m 8.0 s, which is the longitude reduced to time. We thus have 12 h+9 h 10 m+4 h 22 m 8.0 s= 25 h 32 m 8.0 s. As this is more than one full day we must subtract 24 hrs. from the total and we have 1 h 32 m 8.0 s in the morning of October 15 at Greenwich when it is 9 h 10 m p. m. at longitude 65°32′ west.

The computation then proceeds as follows:

| | | | |
|---|---|---|---|
| Gr. Sid. T. of 0 h Oct. 14 | | 1 h 28 m | 41.8 s |
| Red. for long. (4 h 22 m 8 s) | + | | 43.0 |
| | | 1 h 29 m | 24.8 |
| Local time | | 21 h 10 m | 0.0 |
| Reduction for 21 h 10 m 0 s | + 3 | | 28.6 |
| Local Sid. Time | | 22 42 | 53.4 |
| R. A. Vega | | 18 35 | 5.0 |
| Local H. A. | | 4 7 | 48.4 |
| Conversion into degrees of arc | =61 | 57′ | .1 |

However, with the instrument of the present invention we would get the same solution by making the following four simple moves:

1. Rotate the longitude disk 1 until the G registers with 21 h 10 m on the sun disk 2. (Local time is 21 h 10 m.)
2. Rotate disks 1 and 2 together until the sun symbol on disk 2 registers with 1 h 32 m on the Aries disk 3. (Right ascension mean sun is 1 h 32 m.)
3. Rotate disks 1, 2 and 3 together until the Aries sign registers with 18 h 35 m on the star disk. (Right ascension of Vega is 18 h 35 m.)
4. Rotate the handle 5 and rider 6 until G on the longitude disk is at the point of the arrow 7.

The shaft of the arrow 7 will then be at the position 4 h 7 m west of $t$ on the hour angle scale on disk 4. The hour angle of Vega on October 14, 1945, at 9 h 10 m p. m. will, therefore, be 4 h 7 m west. The conversion of the hour angle $t$ from terms of time to arc will also appear on the scale 4ᶜ directly under the shaft of the arrow. The reading will be 61°57′ west.

In making the foregoing computation on the instrument, it will be observed that I have made 65° W. longitude my zero point or "Greenwich." By this means, possible only on the instrument, I have avoided the necessity of reducing all computations to Greenwich. Greenwich is only an arbitrary zero point and any other meridian such as the observer's dead reckoning position may be taken and used with equal accuracy in the result.

Another example may be given:

Find the hour angle of the star Spica on July 26, 1945, at longitude 67° W., chronometer time 12 h 50 m p. m. The time, it will be observed, is given by chronometer and not as local time as in the first example.

From the Nautical Almanac we find that the right ascension of the mean sun on the date mentioned is 20 h 13 m and the right ascension of Spica is 13 h 22 m.

Solution:

1. Rotate disk 1 until the G symbol registers on 12 h 50 m on the sun disk 2.
2. Rotate disks 1 and 2 together until the sun symbol on disk 2 registers with 20 h 13 m on the Aries disk 3.
3. Rotate disks 1, 2 and 3 together until the Aries sign registers with 13 h 22 m on the star disk 4.
4. Rotate handle 5 and rider 6 until 67° west on longitude disk 1 registers with the point of arrow 7 on rider 6. This is because the problem is stated in chronometer time and not in local time.

The symbol $t$ on disk 4 will then be 8 h 52 m east of the shaft of the arrow on rider 6. The hour angle of Spica on July 26, 1945, at 12 h 50 m p. m. will, therefore, be 8 h 52 m east. On scale 4c will appear under the shaft of arrow 7 the conversion into arc 133° east.

In these calculations the seconds of arc or time are disregarded for computations at sea or in an aeroplane are seldom made that close and a few seconds one way or another have little practical importance, and furthermore we are working from dead reckoning position which after all cannot be exact as to seconds.

As another example of the use of the calculating instrument of the present invention, the following is given:

Problem: To find what star would be closest to meridian 67° west at 6 p. m. chronometer time on August 1, 1945. We find from the Nautical Almanac that on August 1, 1945, the right ascension of the mean sun is 20 h 39 m. Greenwich mean time is 18 h. To solve this problem the following operation would be conducted:

1. Place the hour angle $t$ underneath the shaft of the arrow.
2. Rotate the longitude disk 1 until G on said disk registers with 18 h on the sun disk.
3. Rotate disks 1 and 2 together until the sun symbol on the sun disk 2 registers with 20 h 39 m on the Aries disk.
4. Rotate the three disks until the arrow points to longitude 67° W. on disk 1.

Then on the star right ascension scale the symbol Aries registers a value of right ascension of the star of 10 h 10 m. From the Nautical Almanac we find that the star Alphard has a right ascension of 9 h 25 m. This is the closest star to meridian at the time and place mentioned.

5. Rotate disks 1, 2 and 3 until Aries on disk 3 registers with 9 h 25 m on the star right ascension scale; then rotate the handle until the arrow points to 67° W. on disk 1, and under the arrow shaft on the hour angle scale we find 0 h 45 m west as the hour angle of Alphard, showing that it is the closest star to the meridian but 45 minutes past meridian and we read on the outer scale 4c under the arrow shaft 11°15′ which is the bearing of the star Alphard.

Having thus described my invention, what I claim is:

1. A calculating instrument comprising four superposed disks of diameters progressively increasing from top to bottom, rotatably mounted at a common center between a handle and a rider affixed to said handle said top disk being provided with graduations indicating east and west longitude; and said second and third disks being provided with graduations indicating hours and minutes from zero to 24 counterclockwise; and said fourth disk being provided with three scales, one within the other and having their zero points in alignment, said inner scale representing hours and minutes from zero to 24 clockwise and said middle scale representing hours and minutes from zero to 12 in both directions, and said outer scale representing degrees of arc from zero to 180 clockwise and from zero to 180 counterclockwise; and an arrow carried by said rider extending radially across said disks with its point bearing on the perimeter of said longitude disk.

2. A calculating instrument comprising four superposed disks rotatably mounted at a common center between a handle and a rider secured to said handle; said disks being of progressively increasing diameters from top to bottom; said top disk being provided with graduations indicating 180° of east longitude and 180° of west longitude; said second disk being provided with graduations representing hours and minutes counterclockwise from zero to 24; said third disk being provided with graduations indicating hours and minutes counterclockwise from zero to 24; and said fourth disk being provided with three scales having their zeros in alignment, an inner scale having graduations indicating hours and minutes clockwise from zero to 24, a middle scale having graduations indicating hours and minutes clockwise from zero to 12 and counterclockwise from zero to 12, and an outer scale representing degrees of arc from zero to 180 clockwise and from zero to 180 counterclockwise; and an arrow extending radially on said rider across the disks with its point bearing on the circumference of said longitude disk.

3. A calculating instrument comprising four superposed disks of diameters progressively increasing from top to bottom, and a rider secured to a handle, said rider bearing an arrow the point of which extends to the perimeter of said top disk; all of said disks being rotatable between said handle and said rider; said top disk being a longitude disk having its perimeter provided with graduations representing 180° of west longitude clockwise from zero to 180° of east longitude counterclockwise from zero; said second disk being provided with graduations representing hours and minutes from zero to 24 counterclockwise from zero on a circle adjacent the perimeter of said longitude disk; said third disk being provided with graduations into hours and minutes from zero to 24 counterclockwise on a circle adjacent to the perimeter of said second disk; said fourth disk being provided with three concentric scales having their zeros in alignment, the first and inner scale being provided with graduations representing hours and minutes from zero to 24 clockwise on a circle adjacent to the perimeter of said third disk, the second and middle scale being provided with graduations representing hours and minutes from zero to 12 clockwise and from zero to 12 counterclockwise, and the third and outer scale being provided with graduations indicating degrees of arc from zero to 180° clockwise and from zero to 180° counterclockwise on a circle adjacent to the perimeter of said fourth disk.

4. A calculating instrument comprising four disks rotatable between a handle and a rider affixed to said handle, said disks being superposed one on another and being of progressively increasing diameters from top to bottom; the top disk being provided with graduations representing degrees of longitude running 180° clockwise from a zero point and 180° counterclockwise from said zero point around the perimeter of said disk; the second disk next below said longitude disk being provided with graduations representing hours and minutes around a circle corresponding to the circumference of said first disk running from zero to 24 counterclockwise and a zero indicated by a sun sign at the perimeter of said disk; a third disk provided with graduations representing hours and minutes from zero to 24 running counterclockwise around a circle corresponding to the circumference of said second disk and a zero indicated by an Aries symbol on the perimeter of said third disk; a fourth disk provided with an inner scale having graduations representing hours and minutes from zero to 24 running clockwise around a circle corresponding to the circumference of said third disk, a middle scale provided with graduations running from zero to 12 clockwise and from zero to 12 counterclockwise, and a third outer scale provided with graduations representing 180 degrees of arc in both directions, all three scales having their zeros in alignment; and an arrow carried on said rider and radially extending across said second, third and fourth disks, its point bearing on the edge of said first disk.

5. A calculating instrument comprising rotatably mounted superposed disks with progressively increasing diameters; each disk below the top disk being provided with graduations representing hours and minutes around a circle corresponding to the circumference of the disk next above and a zero indicated by an appropriate symbol at the perimeter thereof; the top disk being provided with graduations representing east and west longitude; the second disk representing Greenwich mean time; the third disk graduated from zero to 24 counterclockwise representing right ascension of the sun; the fourth disk being provided with one scale representing right ascension of the star graduated from zero to 24 clockwise, with a second scale outside said first scale representing the hour angle graduated from zero to 12 clockwise and zero to 12 counterclockwise, and with a third scale outside said second scale provided with graduations representing 180 degrees of arc in both directions from zero, all three scales having their zeros in alignment and all of said disks being mounted between a handle and a rider and rotatable therebetween; said rider carrying an arrow extending across said disks with its point bearing on the perimeter of said top disk.

6. A calculating instrument comprising four disks superimposed having progressively increasing diameter; the disks being respectively provided with graduations indicating respectively from the top disk longitude, Greenwich mean time, sidereal time, and three scales with zeros in alignment on said lowest disk representing respectively right ascension of a star, the hour angle of a star, and degrees of arc; the graduations being located on each of the lower three disks around circles corresponding to the circumferences of the disks next above and having zero indications appropriate to each disk at the perimeter thereof; all of said disks being mounted on a common center between a handle and a transparent rider carrying an arrow extending radially across said disks; said disks being rotatable between said handle and said rider.

7. A calculating instrument comprising four disks superimposed one over the other and rotatably mounted on a common center between a handle and a transparent rider, the top disk being provided with graduations representing degrees of east and west longitude around the perimeter, two disks below said top disk being provided with graduations indicating hours and minutes of Greenwich mean time and sidereal time of the sun, said graduations running counterclockwise around a circle corresponding to the perimeter of the disk next above from a zero indication on the perimeters of each said disk; a disk below said sidereal time disk provided with three scales with aligned zeros, one scale representing hours and minutes of the right ascension of a star running clockwise around a circle corresponding to the circumference of said sidereal time disk, a second scale outside said first scale representing the hour angle with graduations indicating hours and minutes running clockwise from zero to 12 and counterclockwise from zero to 12, and a third scale outside said second scale provided with graduations representing 180 degrees of arc clockwise from zero and 180 degrees of arc counterclockwise from zero; and an arrow carried by said transparent rider and having its point bearing on the perimeter of said longitude disk.

EBENEZER HILL.